2,798,802
METHOD FOR THE TREATMENT OF WASTE FERROUS SULFATE LIQUORS

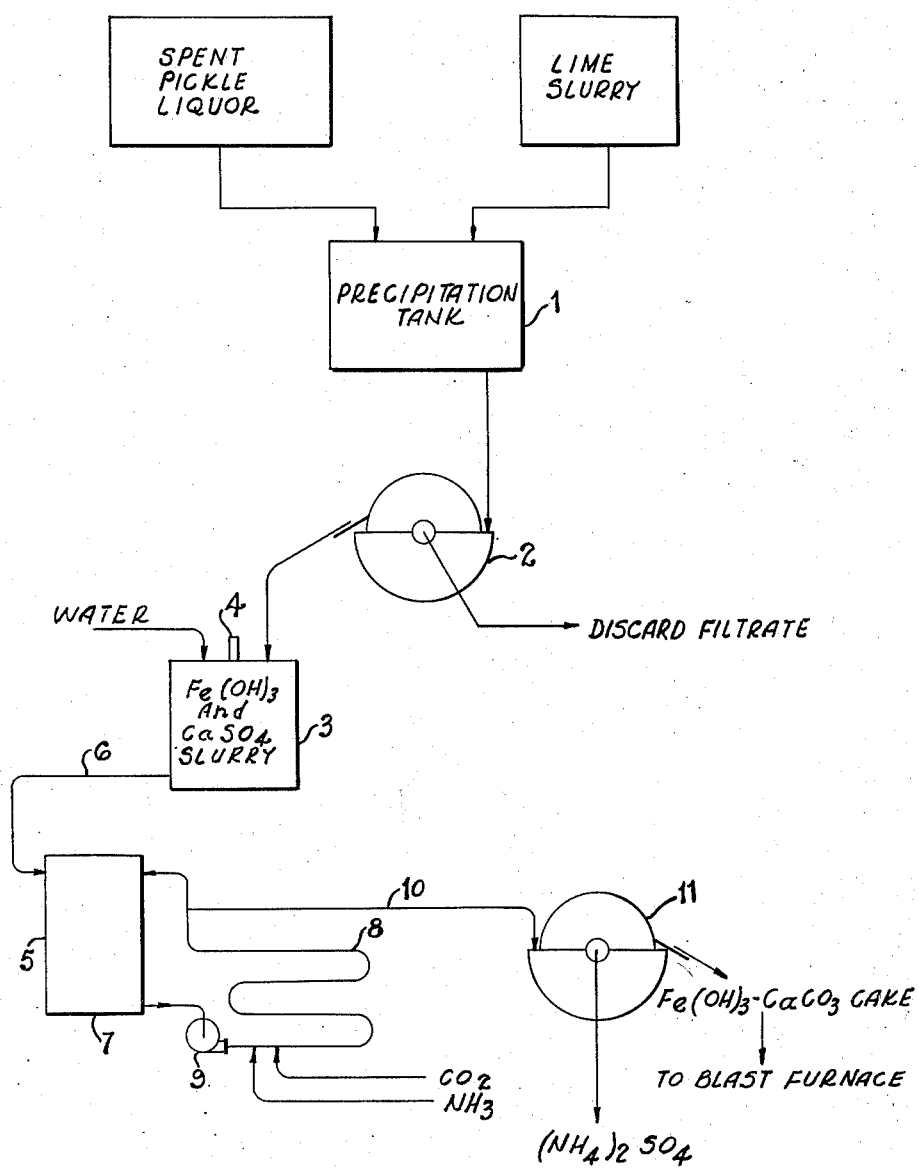

Tuhin Kumar Roy, Elizabeth, and Louis N. Allen, Jr., Short Hills, N. J., assignors to Chemical Construction Corporation, New York, N. Y., a corporation of Delaware Application May 27, 1954, Serial No. 432,707

3 Claims. (Cl. 75—1)

This invention relates to a method for the treatment of spent pickle liquor and similar ferrous sulfate wastes for the recovery of valuable products therefrom.

The problem of disposing of spent pickle liquors and similar ferrous sulfate wastes is one of long standing. Spent pickle liquor is a material resulting from the descaling of iron and steel sheets, wire and the like by immersing them in dilute sulfuric acid; a typical sample contains about 12–18% of $FeSO_4$ and about 1–12% and usually about 3–8% of free sulfuric acid, the balance being mostly water. It is regarded by steel mills as a waste product of no value presenting a constantly increasing disposal problem, since state laws usually limit the quantities that can be run into nearby streams. The principal object of the present invention is to provide a process whereby all the ingredients of the spent pickle liquor will be converted into industrially valuable materials, leaving no objectionable waste products.

The process of our invention employs only one precipitant in addition to the spent pickle liquor itself and this is lime or calcined limestone, commodities which are always available in a steel mill since lime is used in preparing the blast furnace charge. The invention is based on the concept of first neutralizing the spent pickle liquor with lime or calcium hydroxide to form a precipitate of iron hydroxide and calcium sulfate and converting this precipitate into a mixture of iron hydroxide and calcium carbonate. The mixture so obtained may be pelleted, dried and used as part of the blast furnace feed, or it may first be calcined if desired to convert the calcium carbonate into calcium oxide before introducing it into the blast furnace. In the conversion method of our invention the iron hydroxide-calcium sulfate mixture is reacted with ammonia, which is readily obtainable as a by-product from the steel mill coke ovens, and with carbon dioxide, or ammonium carbonate may be used. Ammonium sulfate is therefore also obtained as a useful product which can be recovered and sold as fertilizer.

The invention will be further described with reference to the accompanying drawing, the single figure of which is a flow sheet illustrating the process. Referring to this drawing it will be seen that spent pickle liquor and hydrated lime, preferably in the form of an aqueous slurry, are introduced into a precipitation tank 1, in stoichiometric proportions suitable for neutralizing all of the free acid of the spent pickle liquor and for converting its ferrous sulfate content into the hydroxide or hydrated oxide of iron. The resulting precipitate is filtered on a filter 2 which is illustrated as a rotary vacuum filter but may be of any other suitable type, and the filtrate is discarded. Inasmuch as this filtrate is substantially neutral and contains little or no dissolved compounds it is suitable for discharge into a nearby stream without creating any pollution hazard.

It is known that neutralized ferrous hydroxide is readily converted into ferric hydroxide in the presence of air. Since the neutralization tank 1 is usually open to the atmosphere and the precipitate is contacted with air on the filter 2 it is probable that almost all of the iron is converted into ferric hydroxide during these operations; however, the term iron hydroxide is used to include both ferrous and ferric hydroxides since the state of oxidation of the iron is immaterial in the process.

The filter cake from the filter 2, consisting of a mixture of ferrous or ferric hydroxide and calcium sulfate, is discharged into a slurry tank 3 wherein it is suspended in water. Preferably the quantity of water is so proportioned that a 35%–45% ammonium sulfate solution is obtained in the subsequent reaction of the slurry with ammonia and carbon dioxide. The tank 3 is preferably provided with an agitator 4 in order to form a slurry of uniform composition; this slurry is pumped into a reactor 5 through a line 6 and a pump that is not shown on the drawing.

The rector 5 consists of a reaction tank or autoclave 7, which may be provided with a suitable agitator, and an external reaction coil 8 having inlets for the introduction of ammonia and carbon dioxide as indicated on the drawing. Alternatively an aqueous solution of ammonium carbonate could be injected or aqua ammonia from the hydraulic mains of the coke oven recovery system could be used. It will be understood that the essence of this part of the process is the conversion of calcium sulfate into calcium carbonate and ammonium sulfate by reaction with ammonia and carbon dioxide, either as such or in combination, and therefore the reagents may be brought together in any suitable form.

The slurry of iron hydroxide and calcium sulfate is recirculated from the reactor 7 through the external pipe system 8 by means of a recirculating pump 9 at a temperature of about 70° C. The pressure in the reaction system is maintained at about 20–50 lbs. per square inch gage, and under these reaction conditions the calcium sulfate is converted into calcium carbonate and ammonium sulfate is formed in solution. A side stream containing these reaction products, together with iron hydroxide, is withdrawn preferably continuously through a line 10 and filtered on a filter 11. The filtrate, consisting of a solution of ammonium sulfate in water, is preferably concentrated and passed to a crystallizing system wherein crystals of ammonium sulfate suitable for sale as fertilizer are produced. The filter cake, which is a wet mixture of iron hydroxide and calcium carbonate, is preferably pelletized in a rotary drum or other pellet-forming equipment and dried by contact with hot combustion gases in a rotary kiln. The resulting dry mixture is an ideal blast furnace feed, since it is entirely free from sulfur and contains the iron in a highly reactive form. The calcium carbonate is, of course, useful as a fluxing material during the smelting process. If desired, the dried pellets can be calcined to convert the calcium carbonate into calcium oxide, in which case their value as a blast furnace feed is correspondingly increased.

The invention will be further illustrated by the following specific example to which, however, it is not limited.

Example

To a one-kilogram portion of pickle liquor containing 15% by weight of ferrous sulfate and 2% of sulfuric acid there was added 900 grams of a 10% hydrated lime slurry and the mixture was agitated until precipitation was complete. The mixture was filtered, the filter cake was suspended in 300 grams of water and placed in an autoclave and 110 grams of pure ammonium carbonate were added. The autoclave was closed and the contents were heated at 70–80° C. for 2 hours under a pressure of carbon dioxide of about 2–3 atmospheres gage after which the contents were filtered. The filter cake was washed with water and, after drying, weighed 214 grams. The filtrate contained 105 grams of ammonia sulfate.

What we claim is:

1. A method for the treatment of waste ferrous sulfate liquors containing ferrous sulfate and sulfuric acid which comprises neutralizing said liquors with lime, heating an aqueous slurry of the resulting precipitate with carbon dioxide and ammonia and thereby converting its calcium sulfate content to calcium carbonate and simultaneously forming ammonium sulfate in solution, and separating and drying the resulting mixture of calcium carbonate and iron hydroxide.

2. A method for the treatment of spent pickle liquor which comprises neutralizing it with lime and thereby forming a precipitate of iron hydroxide and calcium sulfate, reacting an aqueous suspension of said precipitate with carbon dioxide and ammonia and thereby converting its calcium sulfate content to calcium carbonate and simultaneously forming ammonium sulfate in solution, filtering the resulting slurry and drying the filter cake, and recovering ammonium sulfate from the filtrate.

3. A method of producing a mixture of iron hydroxide and calcium carbonate, suitable for use in a blast furnace charge, which comprises neutralizing spent pickle liquor with lime and thereby forming a precipitate of iron hydroxide and calcium sulfate, reacting an aqueous suspension of said precipitate with carbon dioxide and ammonia and thereby converting its calcium sulfate content to calcium carbonate and simultaneously forming ammonium sulfate in solution, and filtering the resulting slurry and drying the filter cake.

References Cited in the file of this patent

UNITED STATES PATENTS

| Number | Name | Date |
|---|---|---|
| 1,902,649 | Larsson | Mar. 21, 1933 |
| 2,258,310 | Abbott | Oct. 7, 1941 |
| 2,427,555 | Elzi | Sept. 16, 1947 |
| 2,532,548 | Heide | Dec. 5, 1950 |
| 2,656,247 | Robinson | Oct. 20, 1953 |

FOREIGN PATENTS

| Number | Country | Date |
|---|---|---|
| 607,231 | Great Britain | Aug. 27, 1948 |